3,510,554
COMPOSITION AND METHOD FOR HARDENING FINGER- AND TOENAILS
Georges Balsiger, Lausanne, Vaud, Switzerland, assignor to Magdeleine Benois, Lausanne, Switzerland
No Drawing. Continuation of application Ser. No. 313,163, Oct. 3, 1963. This application Feb. 6, 1968, Ser. No. 703,785
Int. Cl. A61k 7/04
U.S. Cl. 424—61                                         6 Claims

ABSTRACT OF THE DISCLOSURE

Hardening of finger- and toenails to prevent or mitigate brittleness with attendant splitting and breaking is effected by the topical application of a tannin-containing liquid having the following preferred composition:

|  | Parts |
|---|---|
| Tannic acid | 2 |
| Citric acid | 2 |
| Distilled hamamelis water | 20 |
| Spirits of camphor | 3 |
| Spirits of lavender | 20 |
| Ethyl alcohol | 21 |
| Tincture of garlic | 2 |
| Chamomile extract | 10 |
| Cognac | 10 |
| Boric acid | 10 |

This application is a continuation of application Ser. No. 313,163, filed Oct. 3, 1963, and now abandoned.

This invention relates to an improved method for treating nails, particularly human fingernails and toenails, and to improved compositions useful for such treatment.

Long fingernails, while widely considered fashionable, are frequently difficult to grow and are subject to brittleness, breaking, cracking or splitting. It is known that the hardening of the nails is an aid to their growth. Some fingernail base compositions, nail polish removers, and the like, used in manicuring, cause fingernails to become dry and brittle, and susceptible to splitting and breaking, thereby detracting from the appearance of the user, as well as being painful. It is known that the hardening of the nails helps to counteract such effects.

Prior methods of hardening the nails have required the nails to be soaked in chemical solutions for extended periods, then washed and dried. The present invention eliminates the need for soaking and permits the application of the hardening composition in the same manner in which nail polish is ordinarily applied. The application of the composition is rapid and does not involve any unusual steps not ordinarily associated with the manicuring of the nails.

It is an object of the present invention to provide an improved method and composition for hardening finger- and toenails.

It is a further object of this invention to provide a method and composition for treating split or brittle finger- and toenails.

It is a further object of this invention to provide a composition for hardening finger- and toenails, which is antiseptic, analgesic, astringent, antifungicidal, anti-parasitic, and soothing.

Other objects will be apparent to those skilled in the art from reading the following description.

The objects of this invention may be accomplished by the application to the nails of a composition containing tannins. It has been found that the combined action of a particular group of tannin-containing compounds effectively hardens the nails. The mechanism by which the compound of this invention hardens nails is not fully understood, but it is believed that the phenolic functional groups in tannin, such as pyrogallol and catechol, coact to produce the unexpected hardening quality of the invention. It is a feature of the invention that the composition is absorbed by the nails being treated and does not merely form a hardening film on the nails. Hardening films, which may interfere with the biological functions of the nails, are thus avoided.

The tannin-containing ingredients comprising the composition are tannic acid, hamamelis water, cognac and chamomile extract. The ingredients are dissolved in alcohol, preferably ethyl alcohol.

Tannic acid is a substance of vegetable origin which contains phenolic derivatives, such as catechol, pyrogallol, etc. Its action on the tissues is slightly antiseptic, hemostatic and astringent. It is known that tannin precipitates albumins, and its astringent action on undamaged tissue is recognized.

The distilled hamamelis water, or witch hazel, also contains tannin and has a soothing and local angiotonic action on the skin. Similarly, chamomile extract (chamomile oil, roman) contains tannin, an essential oil and mile oil, Roman) contains tannin, an essential oil and an alkaloid: anthemine. The chamomile extract is an astringent and has a stimulating local action.

Cognac is used which has a composition high in ethyl alcohol (40 to 55%), oak tannin and essential esters (ethyl acetate, etc.). The use of a high quality cognac as a biological product with its intrinsic beneficial properties confers upon the invention a special therapeutic, slightly antiseptic action. Also, the cognac provides body and permits rapid drying.

Other ingredients may be added to the formula for particular purposes. For instance, citric acid may be used for its acidifying power on the nail and for its antiseptic and invigorating effects. Lavender spirits which contain at least 30% by weight of linalyl acetate may be used. Lavender spirits have a local stimulating and rubefacient action on the skin without vesicatory action. Moreover, lavender spirits have anti-ectozoan properties. Tincture allii sativium (extract of garlic) contains a substance which is rich in allyl sulfide and causes a capillary vaso-dilation and also has a slightly antiseptic action.

Camphor, which may be used in the composition, is antiseptic, sedative and antiparasitic. The camphor produces a cutaneous vaso-dilation with rubefaction and analgesia. That is, the camphor causes a widening of the lumens of the blood vessels near the surface of the skin producing a temporary reddening of the skin and insensitivity to pain. This is particularly desirable when the nails have been split or cracked.

Ethyl alcohol is preferably used as a solvent for the ingredients and is an antiseptic and a desiccant, and has a relatively pleasant odor.

Blending the tannins with other ingredients such as camphor, boric acid, linalyl acetate, allyl sulfide and the like in an alcoholic solution synergizes their effect, producing surprisingly beneficial results. The composition has an antiseptic action and contains sufficient astringent qualities to harden the nails.

As will be apparent to those skilled in the art other ingredients, such as perfume, coloring agents and bodying agents, may be used in the preparation of the formula.

The present invention contemplates a novel nail coating composition adapted to be applied directly to the fingernails and the like. The composition of the invention is beneficial to the physical structure of the fingernails in that it hardens the nails, strengthens them, aids in reducing cracking and brittleness and enhances the beauty of the nails. The composition substantially eliminates brittleness and dryness of the fingernail from any cause whatsoever, thereafter greatly lessening the breaking and splitting thereof. In addition the novel composition reduces the pain of split nails during the period of treatment. Furthermore, the novel nail base may be applied to the nails immediately prior to the application of a suitable fingernail polish, if desired, or blended with the nail polish and applied simultaneously therewith.

In order more clearly to disclose the nature of the present invention specific examples of the practice of the invention are hereinafter given.

EXAMPLE 1

A preferred embodiment of the invention was made according to the following formula in which all ingredients are stated in parts by weight.

| | |
|---|---|
| Tanic acid | 2.0 |
| Citric acid | 2.0 |
| Distilled hamamelis water | 20.0 |
| Spirits of camphor | 3.0 |
| Lavender spirits | 20.0 |
| Ethyl alcohol, 95 proof | 21.0 |
| Tincture allii sativium | 2.0 |
| Chamomile extract | 10.0 |
| Cognac | 10.0 |
| Boric acid aqueous solution | 10.0 |
| Bergamot oil | 0.03 |
| Lavender oil | 0.03 |

The tannic and citric acids were dissolved in the boric acid solution with slight heating. The remaining ingredients were added in the order set out in the formula. The ingredients were thoroughly blended and allowed to stand for 48 to 72 hours at room temperature. The solution was then filtered in order to remove solid contaminants.

EXAMPLE 2

The composition of Example 1 was topically applied to each of experimental subjects' fingernails. The composition was allowed to dry and to remain on the nail. The treatment was repeated every other day until the desired hardness of the nail was obtained. The treatment was thereafter continued on a weekly basis to maintain the hardness of the nail.

EXAMPLE 3

The composition of Example 1 was added to a standard nail polish. The modified nail polish was topically applied to the fingernails in the usual manner. It was found after using the modified nail polish that the nails were harder than before the treatment was initiated.

What is claimed is:

1. A composition for hardening finger- and toenails comprising tannic acid, distilled hamamelis water, chamomile extract, cognac, and ethyl alcohol, the tannic acid being present in the proportion of 2 parts by weight to about 100 parts by weight of the composition.

2. A composition for hardening finger- and toenails comprising tannic acid, citric acid, distilled hamamelis water, spirits of camphor, spirits of lavender, ethyl alcohol, tincture of garlic, chamomile extract, cognac, boric acid solution, bergamot oil and lavender oil, the tannic acid being present in the proportion of 2 parts by weight to about 100 parts by weight of the composition.

3. A composition for hardening finger- and toenails comprising by weight:

| | Parts |
|---|---|
| Tannic acid | 2 |
| Citric acid | 2 |
| Distilled hamamelis water | 20 |
| Spirits of camphor | 3 |
| Spirits of lavender | 20 |
| Ethyl alcohol | 21 |
| Tincture of garlic | 2 |
| Chamomile extract | 10 |
| Cognac | 10 |

4. A method for hardening finger- and toenails which comprises applying topically to such nails the composition of claim 1.

5. A method for hardening finger- and toenails which comprises applying topically to such nails the composition of claim 2.

6. A method for hardening finger- and toenails which comprises applying topically to such nails the composition of claim 3.

References Cited

Pharmaceutical Formulas, 1944, 11th edition, vol. 1, p. 58, Publishers, The Chemist and Druggist, London, RS 125 p. 45.

ALBERT T. MEYERS, Primary Examiner

D. R. ORE, Assistant Examiner

U.S. Cl. X.R.

424—361